United States Patent [19]
Fenaughty

[11] 3,874,820
[45] Apr. 1, 1975

[54] HINGELESS IN-PLANE ROTOR BLADE DESIGN

[75] Inventor: Ronald Raymond Fenaughty, Trumbull, Conn.

[73] Assignee: United Aircraft Corporation, East Hartford, Conn.

[22] Filed: Apr. 8, 1974

[21] Appl. No.: 458,926

[52] U.S. Cl. ................................................. 416/226
[51] Int. Cl. ............................................ B64c 27/46
[58] Field of Search ........................... 416/144, 226

[56] References Cited
UNITED STATES PATENTS

| | | | |
|---|---|---|---|
| 2,111,975 | 3/1938 | Larsen et al. ...................... | 416/144 |
| 2,152,861 | 4/1939 | Bennett ............................ | 416/226 X |
| 3,232,349 | 2/1966 | Ballauer ........................... | 416/226 UX |
| 3,310,117 | 3/1967 | Slivinsky et al. ................. | 416/144 X |
| 3,484,174 | 12/1969 | McCoubrey ...................... | 416/226 X |
| 3,494,424 | 2/1970 | Stanley ............................ | 416/226 |
| 3,552,881 | 1/1971 | Rogers et al. ................... | 416/226 X |
| 3,647,317 | 3/1972 | Furlong et al. .................. | 416/226 |
| 3,813,186 | 5/1974 | Palachek et al. ............... | 416/144 X |

*Primary Examiner*—Everette A. Powell, Jr.
*Attorney, Agent, or Firm*—Russell M. Lipes, Jr.

[57] ABSTRACT

A hingeless rotor wing system having a relatively stiff in-plane blade which has a one-piece spar of substantially rectangular cross section which is untwisted at the mean blade angle and airfoil defining structure surrounding the spar, the blade angle of the structure relative to the spar being preset to the mean operating angle of the blade in order to reduce the variation of the in-plane natural frequency during operation.

7 Claims, 8 Drawing Figures

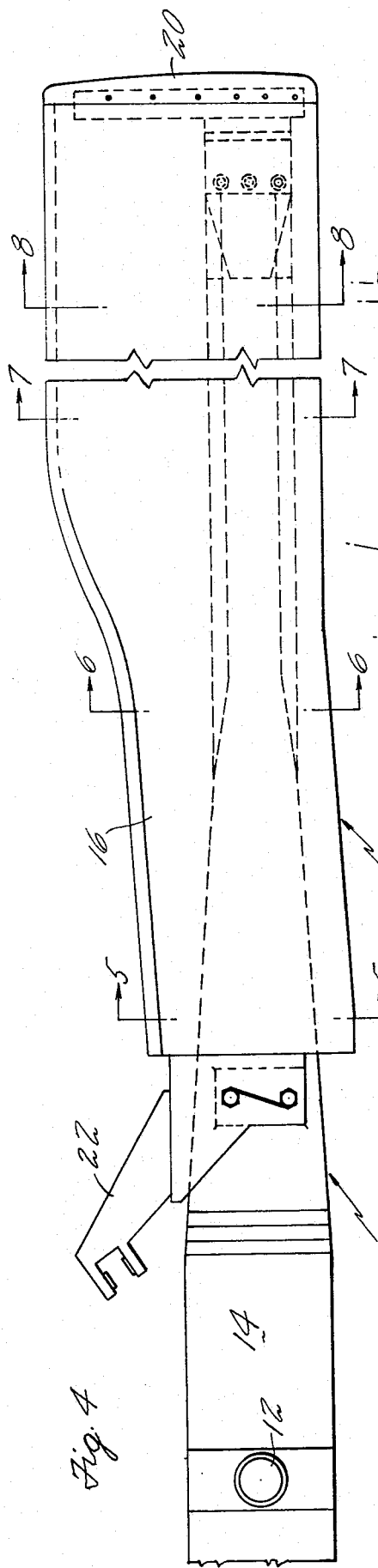
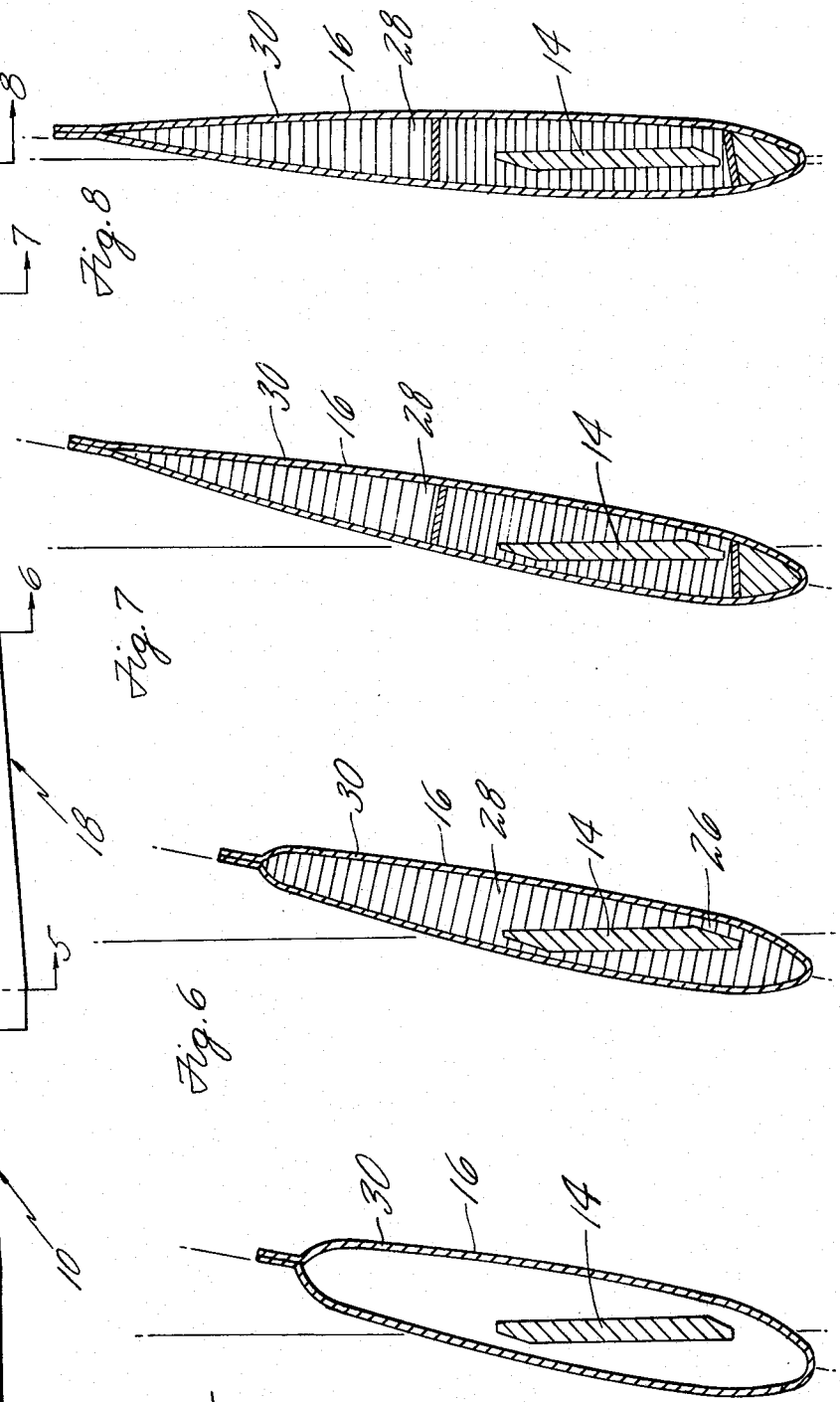

HINGELESS IN-PLANE ROTOR BLADE DESIGN

BACKGROUND OF THE INVENTION

1. Field of the Invention

This invention relates to relatively stiff in-plane blades for a helicopter hingeless rotor system and more particularly to a blade construction in which the blade angle relative to the blade spar is preset to the mean operating angle in order to minimize the maximum absolute angle of the spar over the range of required blade angle operation.

2. Description of the Prior Art

Helicopters have been characterized by the relative complexity of their rotor systems. Fully articulated rotors have been successfully used and have brought the helicopter a long way. However, articulated rotors have complicated hub mechanisms to provide blade flapping, lagging and pitching motions, and involve high cost and maintenance requirements. The disadvantages have been somewhat overcome by use of an elastomeric bearing which has eliminated some of the intricacy although heavy and expensive, and permitted the use of nonarticulated or hingeless rotors. Even the hingeless rotor has its attendant problems. For example, it is desirable for the blade in-plane or edgewise natural vibration frequency to be separated from the flatwise natural frequency. However, when blade pitch is changed the natural frequencies change, and a coalescence of blade natural frequencies or resonant condition can result. This problem it has been found can be met by selective angular location of the airfoil portion of a blade with respect to the blade spar.

Bennett U.S. Pat. No. 2,152,861 shows an articulated rotor blade construction in which the major axis of an elliptical spar is not coincident with the major axis of the blade airfoil fairing. The only reasons given for this are to facilitate shaping of the spar and to obtain a smooth surface on the upper surface. Both Stanley et al U.S. Pat. No. 2,272,439 and Furlong et al U.S. Pat. No. 3,647,317 show blade constructions in which the major axis of a spar seemingly is not aligned with the major axis of the blade airfoil, but no reason is given for these apparent incidental showings.

SUMMARY OF THE INVENTION

An object of the present invention is to provide an improved rotor blade for helicopters.

Another object of the invention is to provide a helicopter rotor blade construction which minimizes the unwanted variation in natural frequency over the normal operating range of a hingeless in-plane rotor.

In accordance with the present invention, a rotor system of hingeless construction employs a one-piece cross-beam spar construction, such as shown in co-pending application Ser. No. 132,459 filed Apr. 8, 1971. The spar is of substantially rectangular cross section. The airfoil of the blade is constructed about the spar at a blade angle with respect to the spar which is equivalent to the mean operating angle of the blade.

The foregoing and other objects, features and advantages of the invention become more apparent in the light of the following detailed description of a preferred embodiment thereof, as illustrated in the accompanying drawings.

BRIEF DESCRIPTION OF THE DRAWINGS

FIG. 4 is a plan view of a helicopter rotor blade constructed in accordance with this invention.

FIGS. 5–8 are section views through the blade of FIG. 4 as indicated by corresponding section lines in FIG. 4, showing the relationship of the airfoil of the blade to the spar.

DESCRIPTION OF A PREFERRED EMBODIMENT

Figure 1:
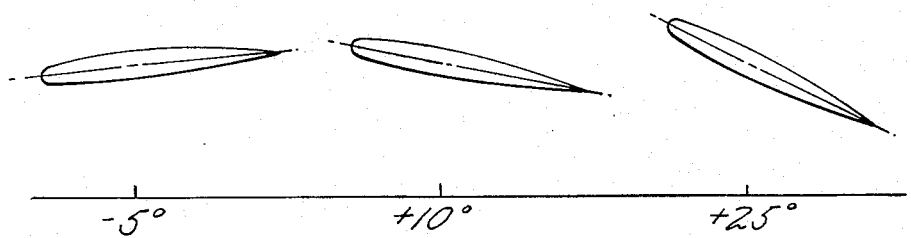
FIG. 1 is a graphic illustration of helicopter rotor blade angles at the extremes and the mean of a typical operating range.
Figure 2:
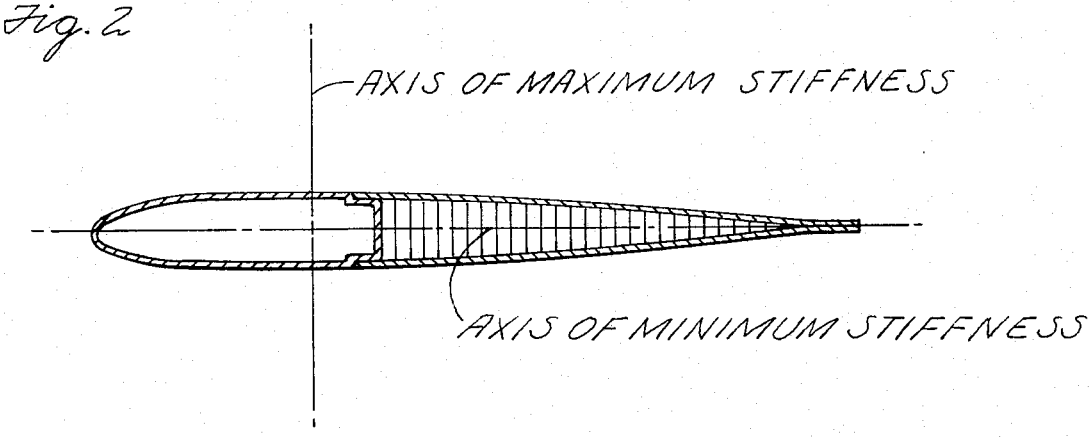
FIG. 2 is a graphic illustration of the maximum and minimum stiffness axes for a conventional helicopter rotor blade.

The first in-plane (i.e., edgewise or chordwise) natural vibration frequency of stiff in-plane helicopter rotors varies with blade feathering angle due to differences in both structural and centrifugal stiffness between the two orthogonal planes parallel and perpendicular to the axis of rotation. The normal pitch angle operating range is about 30° and, as illustrated in FIG. 1, this range is biased in one direction and the mean blade angle is not zero. In FIG. 1, the representative operating range is from −5° to +25° and the mean blade angle is +10°. In prior art blades, the structural blade member is aligned to the airfoil as typically shown in FIG. 2. The controlling structural axes of maximum and minimum stiffness are perpendicular and parallel, respectively, to the airfoil and these axes go through the same angular operating range as the airfoil.

Figure 3:
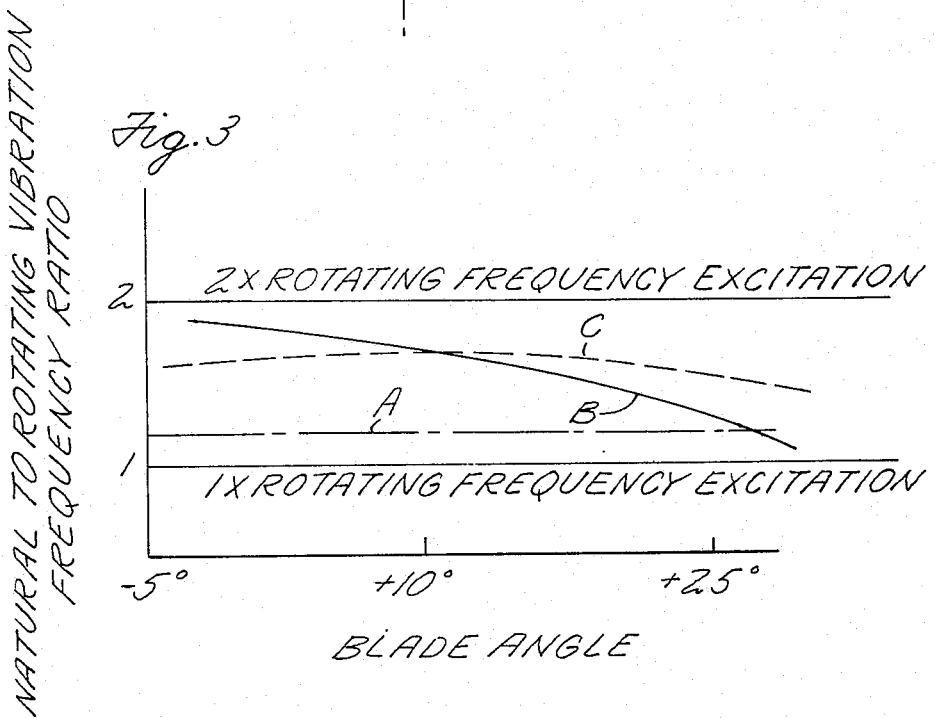
FIG. 3 is a graph showing the variation of the natural to rotating vibration frequency ratio versus blade angle for a typical relatively stiff in-plane helicopter rotor blade.

Over the normal blade pitch angle operating range, the natural frequency may vary 0.3 to 0.4 per revolution depending on the particular blade design, and a plot of the frequency/blade angle curve is non-linear with frequency decreasing as blade angle increases. The problem is to design a rotor blade which has a natural frequency over its operating range so that the blade will operate in a "window" between orders of excitation. Further, provision must be made of sufficient separation between any two modes to prevent dynamic instability. FIG. 3 is a plot of forcing frequencies at multiples of rotational speed versus blade angle for a rigid in-plane rotor. Straight horizontal line A on the plot is the flatwise natural frequency curve. Curve B is for a conventionally designed blade and shows that as blade angle increases, the first inplane or edgewise blade natural frequency reduces as increased bending about the axis of minimum stiffness takes place. As the natural and forcing frequencies coincide, resonance occurs and blade stresses increase. A desirable blade design is one in which through proper preselection of the blade angle with respect to the spar, the frequency increases from the minimum blade angle to about the mean blade angle and then decreases to the maximum blade angle. This is shown by the broken line of curve C on the plot.

The structural embodiment of this invention is shown in FIGS. 4–8. FIG. 4 is a plan view of helicopter rotor 10 which rotates about drive shaft 12. The rotor is of a composite construction having a one-piece spar 14 extending in opposite directions from the drive shaft. The spar is of substantially rectangular cross section, as can be seen in FIGS. 5–8. The radially outward portion of each end of the spar, one of which is shown in FIG.

4, has an airfoil shaped structure 16 surrounding it defining blade 18. Tip cap 20 completes the blade. Pitch horn 22 is attached to a radially inboard portion of the blade for controlling blade pitch.

The construction is such that when the major axis of the spar, which axis extends in a chordal direction, essentially in the plane of rotation is at a zero angle of attack, the angle of attack of the airfoil portion of the blade is at the mean operating angle. For the representative blade of FIG. 1, the blade angle would be +10°. For an untwisted blade, this +10° setting would be the same along the blade span, and for a twisted blade this setting would occur at some span location such as the 75% station with the setting being progressively less in an outboard direction and progressively more in an inboard direction.

FIGS. 5-8 are sections through the blade at the span stations indicated by section lines 5—5, 6—6, 7—7 and 8—8 in FIG. 4. They show the relative angular position of airfoil shaped structure 16 with respect to spar 14. As can be seen, upper and lower surfaces of the spar are beveled, as at 24 and 26 in FIG. 6, to accommodate the surrounding structure. A filler 28 of suitable material occupies the space between spar 14 and blade skin 30, extending over a portion of the blade span.

Although the invention has been shown and described with respect to a preferred embodiment thereof, it should be understood by those skilled in the art that the foregoing and other changes and omissions in the form and detail thereof may be made therein without departing from the spirit and scope of the invention, which is to be limited and defined only as set forth in the following claims.

I claim:

1. A hingeless rotor wing system including at least one rotor blade having an operating angle range extending from a minimum angle to a maximum angle, said blade having a spar extending over a majority of the blade span, controlling the primary blade vibration frequencies, said spar having a major axis, structural means surrounding said spar and defining an airfoil shape for said rotor blade, said structural means also having a major axis, the angular relationship of said spar major axis and said structural means major axis being substantially equivalent to the mean blade angle of said blade operating angle range.

2. A rotor blade for a hingeless rotor wing system in accordance with claim 1 in which the spar is essentially of rectangular cross section.

3. A rotor blade for a hingeless rotor wing system in accordance with claim 2 in which upper and lower surfaces of the rectangular spar are bevelled to accommodate the surrounding structural means.

4. A rotor blade for a hingeless rotor wing system in accordance with claim 1 in which the blade is relatively stiff in-plane and relatively flexible in a plane perpendicular to the in-plane plane.

5. A rotor blade for a hingeless rotor wing system, said blade being relatively stiff about an axis perpendicular to the blade rotational plane and having an angular range of operation extending from a minimum angle to a maximum angle with respect to said rotational plane, a spar for said rotor having a major axis essentially parallel to the blade rotational plane, blade structural means surrounding said spar and defining an airfoil shape for said blade, said structural means also having a major axis, said structural means having an angular relationship with respect to said spar at at least one spanwise location along said blade equal to the mean angle of the range of operation.

6. A rotor blade in accordance with claim 5 in which the angular relationship of the structural means to the spar is equal to the mean angle of the range of operation along the full blade span.

7. A rotor blade in accordance with claim 5 in which the blade structural means has an inboard edge to which means is connected for varying the operational angle of said blade.

* * * * *